UNITED STATES PATENT OFFICE.

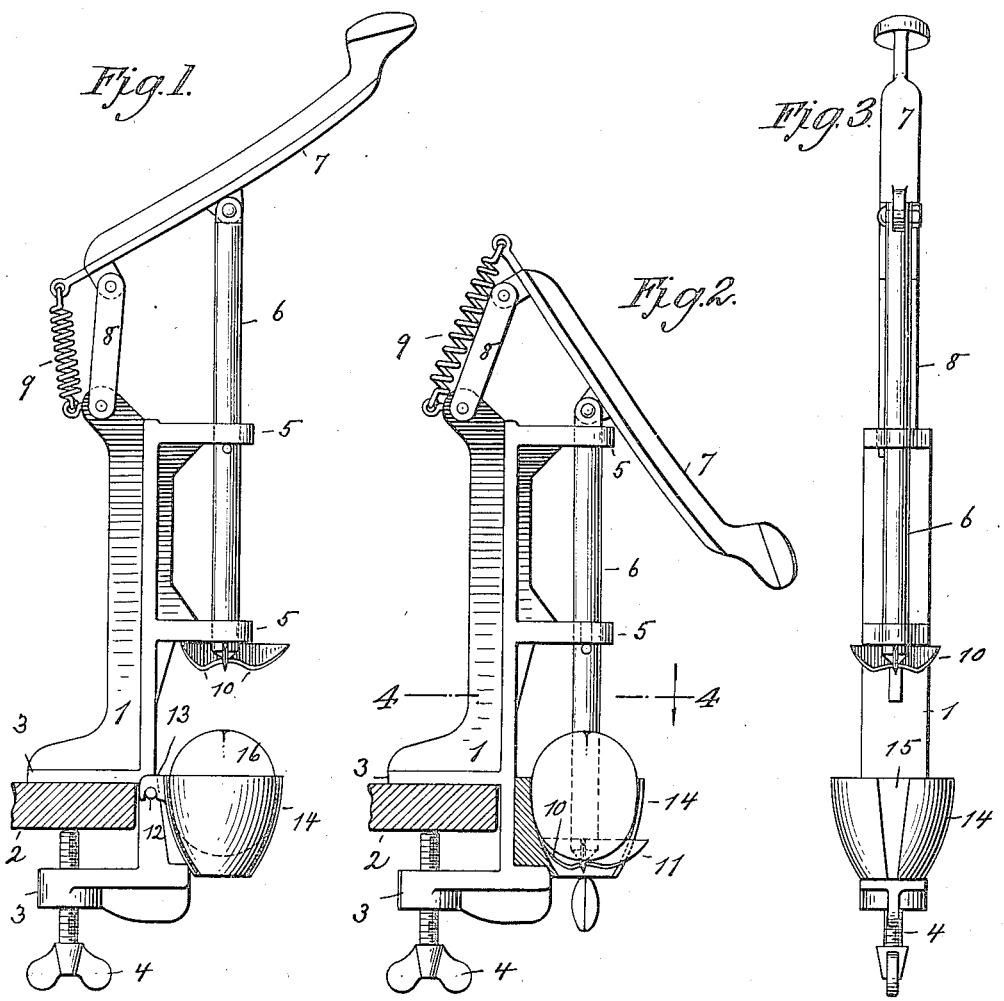

BERNHARD MAI, OF WEST HOBOKEN, NEW JERSEY.

FRUIT-STONING APPARATUS.

1,225,838.  Specification of Letters Patent.  Patented May 15, 1917.

Application filed October 31, 1916. Serial No. 128,651.

*To all whom it may concern:*

Be it known that I, BERNHARD MAI, a citizen of the German Empire, and a resident of West Hoboken, in the county of Hudson and State of New Jersey, have invented certain new and useful Improvements in Fruit-Stoning Apparatus, of which the following is a specification.

This invention relates to an apparatus of novel construction for stoning peaches and other fruit, and for simultaneously cutting as well as slitting the same. The apparatus works quickly and efficiently and is well adapted for household use.

In the accompanying drawing:

Figure 1, is a side elevation of a fruit stoning apparatus embodying my invention, showing the plunger raised;

Fig. 2, a similar view with the plunger depressed;

Fig. 3, a front view;

Fig. 4, a horizontal section on line 4—4 Fig. 2, and

Fig. 5, a perspective view of a peach cut, slit and stoned with the apparatus.

The device comprises essentially, a frame 1, adapted to be secured to a table or other support 2, by means of a pair of jaws 3, and clamp screw 4.

From frame 1, project a pair of apertured bearings 5, for the guidance of a vertically movable plunger 6, to which is pivoted a handle 7. This handle is secured to frame 1, by a pivoted link 8, and is influenced by a spring 9, which has a tendency to raise the handle together with the plunger. To the lower end of plunger 6, is secured a cutter, comprising a plurality of radially disposed blades, four of which are shown. Of these, all of the blades 10, save one, are of the same length, and are adapted to slit the fruit, without cutting through the peel, while the fourth blade 11, is of greater length than blades 10, and is adapted to cut the fruit by passing through its peel as well as through its flesh. All of the blades 10 and 11 have a lower cutting edge, which from the axis of the plunger is first concaved and slopes downward, for a certain distance and is thence convexed and slopes upward toward the tip of the blade. The inner sloping sections are adapted to penetrate the fruit and to then grasp the stone and push the same down, while the outer sloping sections are adapted to slit and cut the fruit sidewise of the stone, so as to form a clearance therefor. At a proper distance below the plunger, there is removably secured to frame 1, by pins 12 and hooks 13, a cup 14, having an open bottom and of a size to snugly accommodate the fruit, the radius of the cup being greater than the length of blades 10, but less than the length of blade 11. In order to furnish a passage for the protruding end of blade 11, cup 14 is provided with a longitudinal outwardly opening slot 15, which is open at both ends, and tapers from top to bottom, so that the blade may freely enter the same, with a minimal removal of the cup-wall.

As the plunger is depressed by its handle 7, the knives will cut through the fruit 16 above the stone, and thence through the body of the fruit while the stone is simultaneously pushed out of the fruit through the open bottom of the cup, whence it will fall into a suitable receptacle (not shown). As the knives 10, pass through the fruit, they will slit the same as at 17, around the stone-cavity, while the knife 11 will make a clean cut through the flesh and peel of the fruit as at 18. In this way, the fruit while being stoned, is opened up, and is at the same time, subdivided into a plurality of connected segments, in which condition it is well adapted for various household uses.

I claim:

1. A fruit stoning apparatus comprising a frame, a plunger mounted therein, a plurality of radially disposed blades carried by the plunger, one of said blades being longer than the other blades, and a cup below the plunger, said cup having a longitudinal outwardly opening slot adapted to accommodate the protruding end of the longer blade.

2. A fruit stoning apparatus comprising a frame, a plunger mounted therein, a plurality of radially disposed blades carried by the plunger, one of said blades being longer than the other blades, the cutting edges of all of the blades having inner concaved sections and outer convexed sections and a cup below the plunger.

BERNHARD MAI.